June 12, 1951 A. H. ROCHE ET AL 2,556,219
NEGATIVE FEEDBACK CIRCUIT FOR PARALLEL-CONNECTED THERMIONIC AMPLIFIERS
Filed April 5, 1947
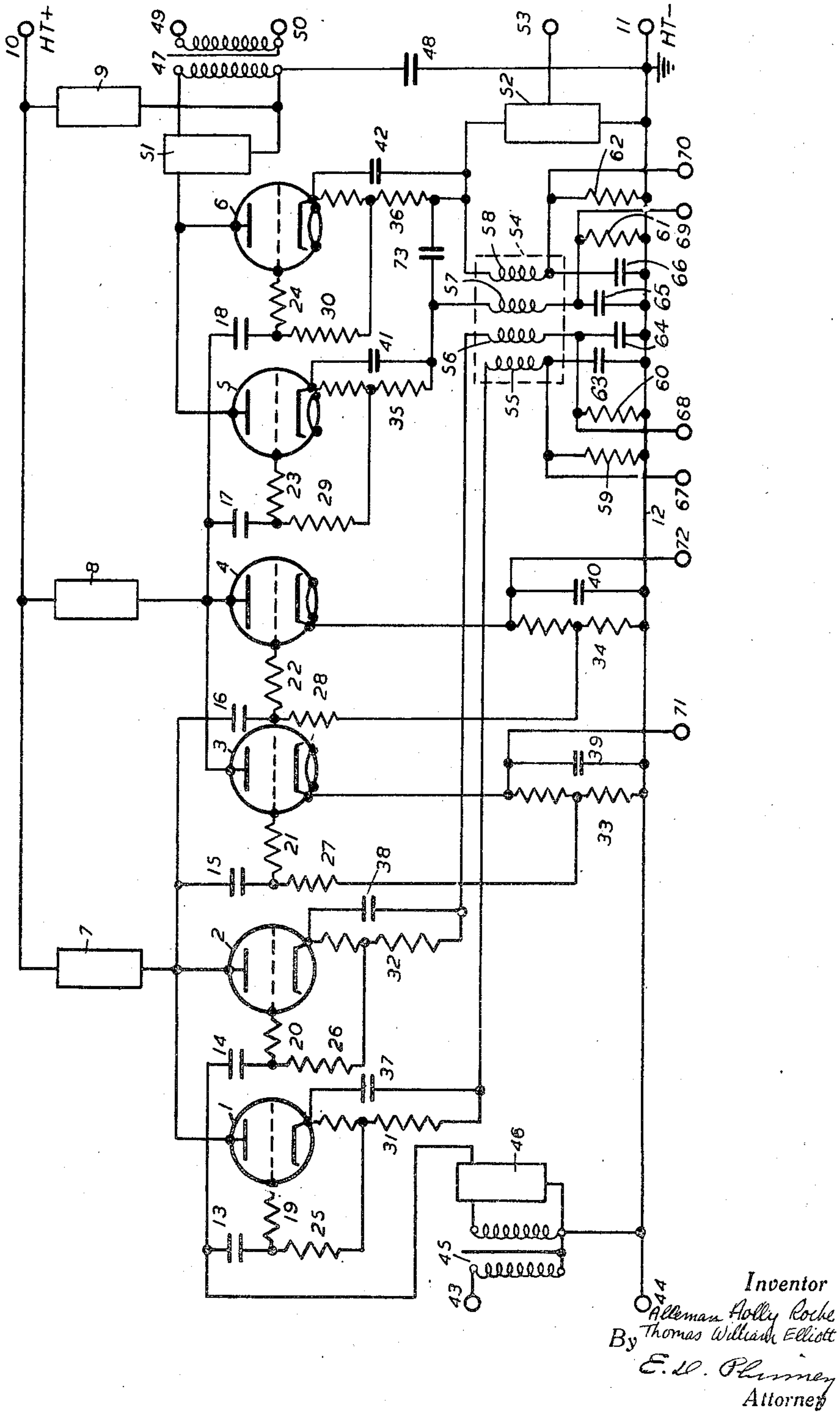
Inventor
Alleman Holly Roche
By Thomas William Elliott
E. W. Plumney
Attorney Patented June 12, 1951 2,556,219

UNITED STATES PATENT OFFICE 2,556,219

NEGATIVE FEEDBACK CIRCUIT FOR PARALLEL-CONNECTED THERMIONIC AMPLIFIERS

Alleman Holly Roche and Thomas William Elliott, London, England, assignors to International Standard Electric Corporation, New York, N. Y.

Application April 5, 1947, Serial No. 739,690
In Great Britain March 19, 1946

Section 1, Public Law 690, August 8, 1946
Patent expires March 19, 1966

7 Claims. (Cl. 179—171)

The present invention relates to electric wave amplifiers having negative feedback, and is concerned primarily with the design of an amplifier in which two stages are coupled by a cathode feedback network in a manner which maintains completely separate cathode current circuits for the valves of the said stages.

In amplifiers which are intended for installation in unattended stations, it is necessary to arrange so that the failure or incipient failure of any one of the valves shall be automatically notified at a control station, and it is also preferable that the amplifier be designed so that it will still operate satisfactorily when one of the valves has failed. This latter condition generally necessitates duplicating the valves in each stage, and with cathode feedback it results that at least four valves share a common cathode feedback network. Difficulties therefore arise in measuring or indicating each cathode current separately for the purpose of notifying at the control station the failure of a particular valve, and the object of the present invention is to provide means for coupling the stages in an amplifier of the above-mentioned type which enables the cathode currents to be completely separated. The invention accordingly provides a negative feedback electric wave amplifier comprising two amplifying stages including thermionic valves having their cathodes sharing in common a cathode feedback network, the said cathodes being each connected to a corresponding winding of a transformer, and the said cathode feedback network being also connected to a winding of the said transformer.

The invention will be illustrated by an embodiment, a schematic circuit diagram of which is shown in the figure of the accompanying drawing. This embodiment is a three-stage high-frequency amplifier having cathode feedback between the first and last stages, and is of known design except for the features in accordance with the invention, which will be clearly pointed out. As the amplifier is intended to be used at an unattended station, each stage comprises two parallel-connected similar valves provided so that failure of one of the valves of any stage will not greatly affect the performance of the amplifier. The invention provides means for giving signals which will separately indicate the failure of any of the valves of the amplifier, and the parallel arrangement of the two valves of each stage enables the amplifier to continue functioning satisfactorily until the faulty valve indicated by the signal can be replaced.

The three stages of the amplifier respectively comprise valves 1 and 2, 3 and 4, and 5 and 6, which are shown as triodes for simplicity, but will preferably be pentodes with the additional electrodes polarised in the usual way (not shown). The anodes of each pair of valves are connected together and share one of the anode circuit impedance networks 7, 8 and 9 which are indicated as rectangular blocks, and will be designed in accordance with known practice having regard to the requirements of the amplifier. These impedance networks connect the anodes to the positive high tension terminal 10, the negative high tension terminal 11 being connected to a bus-bar conductor 12 which is preferably connected to ground as shown.

The control grids and cathodes of the valves of each pair are provided with separate but similar circuit elements. Thus the control grids of the valves 1 to 6 are provided respectively with input blocking condensers 13, 14, 15, 16, 17 and 18 and with series stopping resistances 19, 20, 21, 22, 23 and 24 and with the usual leak resistances 25, 26, 27, 28, 29 and 30. The six cathodes are connected to the bus-bar 12 through circuits including tapped resistances 31, 32, 33, 34, 35 and 36, the leak resistances being connected to the respective taps. The tapped resistances are shunted respectively by condensers 37, 38, 39, 40, 41 and 42.

The signals to be amplified are applied to the input terminals 43 and 44 (the latter of which is connected to the bus-bar 12), and thence through a screened input transformer 45 to the control grids of the valves 1 and 2 through the corresponding blocking condensers. An equalising network of any suitable type may be provided, if desired, between the input transformer 45 and the valves 1 and 2, as indicated by the block 46.

The anodes of the valves 1 and 2 are connected directly to the blocking condensers 15 and 16 of the second stage, and the anodes of the valves 3 and 4 are connected directly to the blocking condensers 17 and 18 of the third stage. The anodes of the valves 5 and 6 are connected through the primary winding of a screened output transformer 47 to the corresponding anode load impedance 9, the usual grounded by-pass condenser 48 being provided. The secondary winding of the transformer 47 is connected to a pair of output terminals 49 and 50 from which the amplified signals are obtained. A second suitable equalising network 51 may be provided if desired between the anodes of the valves 5 and 6 and the primary winding of the transformer 47.

The amplifier is provided with cathode negative feedback between the first and third stages by means of a cathode network of any suitable type indicated by the block 52. A terminal 53 is shown connected to the network 52 to which may be applied an automatic gain control voltage or current derived from or controlled by a pilot current in known manner for varying the network characteristics and thereby the amplifier gain in a suitable manner.

According to conventional practice, the cathode circuits of all the four valves 1, 2, 5 and 6 (comprising the odd-numbered stages) would usually be connected directly in parallel to one terminal of the network 52, the other terminal of 52 being connected to ground. If this is done, however, it becomes practically impossible to measure or indicate individually the cathode currents of the four valves, particularly in the case of an amplifier intended for high frequencies, because this would involve connecting the measuring or indicating means between each cathode and the network 52, and it would then be found that the ground capacity of the measuring or indicating means would shunt the cathode network 52 and would completely alter the characteristics of the negative feedback introduced. Such capacity moreover would be generally large and variable so that it would be impracticable to compensate or allow for it.

According to the invention, therefore, a transformer 54 with four windings 55, 56, 57 and 58 is provided, and the cathode circuits of the four valves are respectively connected through these windings to the grounded bus-bar 12, four resistances 59, 60, 61 and 62 shunted by by-pass condensers 63, 64, 65 and 66 being respectively included between the transformer windings and the bus-bar 12. The cathode network 52 is connected between the upper terminal of winding 58 and the bus-bar 12.

The four windings 55, 56, 57 and 58 of the transformer 54 should preferably be as closely alike as possible and should be very closely coupled. For example, they could be wound in well known manner from four wires formed into a spiral four, and wound on a suitable former or core. The connections should be such that the induced electro-motive forces are in the same direction in all the windings for currents flowing from the cathodes; in other words the connections are parallel-aiding connections. It will be appreciated that by this arrangement according to the invention, the direct currents flowing from the cathodes of the valves are kept separate until the bus-bar 12 is reached, but the transformer effectively connects all the cathodes in parallel to the cathode network 52 for the signal currents, and the effect is substantially as though they were directly connected to the cathode network as in the conventional arrangement. It will be understood, of course, that the condensers 63 to 66 should be sufficiently large to have negligible reactance at the signal frequencies, so that the lower ends of the transformer windings will be effectively grounded.

The resistances 63 to 66 should be of such value that when the cathode currents of the four valves are normal, the potential drop across each resistance is some specified value such as 5 volts. Terminals 67, 68, 69 and 70 are connected to the upper ends of those resistances for connection to any suitable means (not shown) for indicating or measuring this potential drop, and/or for giving an alarm when it departs from the specified value.

The valves 1, 2, 5 and 6 are all shown as being provided in the same way with additional local negative feedback of suitable amount. Thus in the case of valve 1, the local feedback is determined by the resistance 31 which is of such value and tapped in such a manner that the required amount of negative feedback is introduced while providing at the same time appropriate bias for the control grid. The condenser 37 is not in this case a by-pass condenser of negligible reactance, but has a capacity of such value as to give the local feedback the required characteristics. The other three valves are provided with local feedback in exactly the same way, and these arrangements will be understood by those skilled in the art, and are not features of the present invention.

The two valves 3 and 4 (constituting an even-numbered stage) are not provided with local feedback, and the cathode of valve 3 is connected to the bus-bar 12 through the resistance 33 shunted by the condenser 39 which in this case is a by-pass condenser of negligible reactance at the signal frequencies. The resistance 33 should be of such value that the total potential drop due to the cathode current is the above-mentioned specified value (5 volts), and the tapping point should be so chosen that the control grid is appropriately biassed. Valve 4 is equipped exactly similarly. Terminals 71 and 72 are respectively connected to the cathodes of the valves 3 and 4, and may be connected to indicating, measuring or alarm means as in the case of terminals 67 to 70.

It will be understood that the transformer 54 should be wound in such manner that the self-capacity of the windings is reduced to a minimum. This self-capacity will clearly operate in parallel with the cathode network 52, but will be constant and can be compensated or allowed for if necessary. It will be seen that with the arrangement according to the invention, the indicating or measuring means does not shunt the network 52, and is substantially short-circuited by the condensers 63 to 66 for the signal frequencies.

The network 52 could theoretically be connected to any of the transformer windings, but as the transformer is not ideal in practice, and has a certain amount of resistance associated with the windings, it is found best to connect the network to one of the windings associated with the output stage. The transformer resistance should, of course, be reduced to a minimum, and the condenser 73, which should be large enough to have negligible reactance at the signal frequencies, is connected between the upper ends of the windings 57 and 58, so that if the valve 6 should fail, the network 52 is connected substantially directly to the cathode of the valve 5. In this way the resistance of the winding 58 (which winding is ineffective on the failure of the valve 6) is effectively removed, and therefore the change in gain consequent on the failure of the valve is reduced to a minimum.

It is to be noted that the network 52 should have no direct current path therethrough, and if necessary, therefore, a suitable blocking condenser (not shown) of negligible reactance should be included somewhere in this network. The network 52 could alternatively be connected to a fifth winding (not shown) of the transformer 54 closely coupled to the other four windings, instead of directly to the winding 58.

As is well known, according to the conventional arrangements, when cathode feedback is employed the two stages coupled by the feedback path can have any odd number of stages between them.

According to the present invention, therefore, with the arrangement which has been described, there may be any odd number of stages between the pairs of valves 1, 2 and 3, 4 which are coupled by the feedback path. According to the invention also, if the connections of the windings 55 and 56 are reversed, there may be zero or any even number of stages between the pairs of valves 1, 2 and 3, 4. This will preserve the necessary phase reversal for transit round the whole feedback loop.

It is also evident that the first and last stages could each consist of a single valve, or of more than two valves connected effectively in parallel in the manner indicated. The transformer 54 should in all cases have a number of equal closely coupled windings, one winding for each valve in the first and last stages, and a set of elements corresponding to 59, 63 and 67 could be provided for each valve. The cathodes of all the valves would be connected respectively to the bus-bar 12 in the manner which has been explained.

The resistances 59 to 62 could evidently be replaced, if desired, by a suitable current or voltage measuring instruments, or by alarm relays adapted to operate when the cathode current (or the corresponding voltage drop) departs from the specified value by more than some predetermined amount. Preferably, however, the terminals 67 to 72 will be connected to a valve failure alarm circuit of the kind described in the specification of the co-pending application of B. B. Jacobsen, bearing Serial Number 747,893, filed May 14, 1947, now Patent No. 2,547,011, issued April 3, 1951.

It will be understood that many of the details of the amplifier which has been described as an example to illustrate the invention may be varied in a number of ways so long as the valves of the first and last stages are coupled to the cathode network by means of a transformer in the manner explained.

What is claimed is:

1. An amplifier for an unattended repeater station comprising a plurality of amplifying valves in cascade stages, a pair of said valves connected in parallel, means associated with the cathode of each of the valves of said amplifier from which the magnitude of cathode current of each valve may be separately indicated, means for providing a degenerative feedback to said amplifier comprising a transformer having a plurality of windings, one of said windings serially connected between ground and the cathode of one of the valves of a first stage of said amplifier, and other different of said windings separately coupling the cathodes of said pair of valves.

2. An amplifier as claimed in claim 1, wherein each of the cascade stages of said amplifier comprises a pair of valves, each pair connected in parallel, different of said windings serially connected between ground and the cathodes of different of the valves of the first stage of said amplifier.

3. An amplifier as claimed in claim 1 further comprising a plurality of by-pass condensers each shunted across different of said means associated with the cathode of each of said valves from which the magnitude of cathode current of each valve may be separately indicated, the impedance of each of said condensers being negligible at the frequency of the signals to be amplified by said valves.

4. An amplifier as claimed in claim 1, wherein said means associated with the cathode of each of said valves from which the magnitude of cathode current of each valve may be separately indicated, comprises individual resistances.

5. An amplifier as claimed in claim 1 further comprising a condenser connected across the cathode ends of the transformer windings coupling the cathodes of said pair of valves.

6. An amplifier as claimed in claim 1, further comprising a plurality of separate means for introducing local degenerative feedback, different ones of said last-named means connected to different of the valves of said amplifier, said means serially connected between selected of said valves and said transformer windings.

7. An amplifier as claimed in claim 1 wherein said amplifier comprises an odd-number of intermediate amplifying stages between a first stage and said pair of valves, respective of the windings of said transformer being connected serially between the ground and the cathodes of each valve included in said odd-numbered stage, all of said windings connected in parallel aiding connection.

ALLEMAN HOLLY ROCHE.
THOMAS WILLIAM ELLIOTT.

REFERENCES CITED

The following references are of record in the file of this patent:

UNITED STATES PATENTS

| Number | Name | Date |
|---|---|---|
| 2,161,844 | Babler | June 13, 1939 |
| 2,342,544 | Jacobs | Feb. 22, 1944 |
| 2,452,663 | Glover | Nov. 2, 1948 |
| 2,462,190 | Hipple, Jr. | Feb. 22, 1949 |